Figure 1:
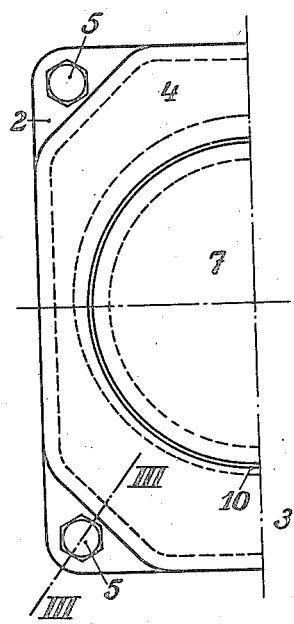

April 7, 1936.                    V. A. BARY                    2,036,453

SEAL FOR AXLE BEARINGS

Filed Aug. 1, 1930                2 Sheets-Sheet 1

Inventor:
V. A. BARY
By Joseph Hirschman
Attorney

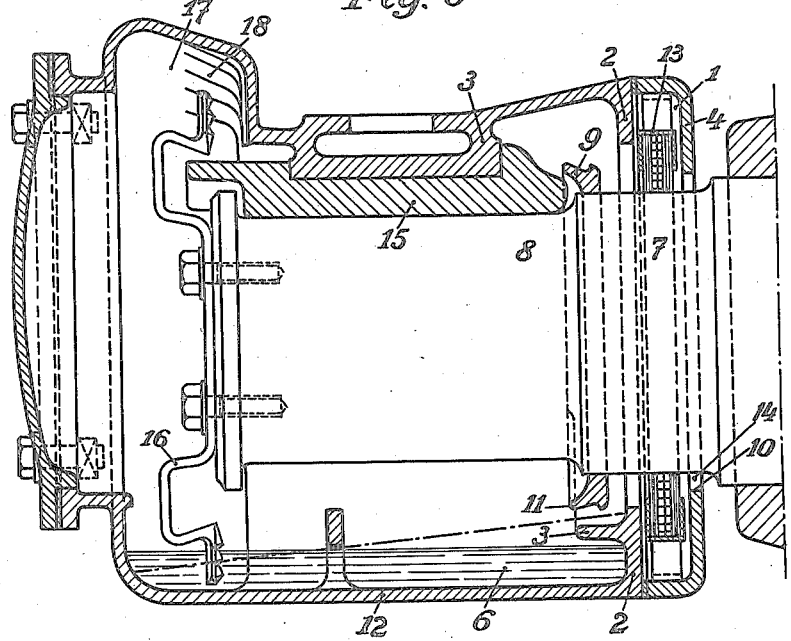

Patented Apr. 7, 1936

2,036,453

UNITED STATES PATENT OFFICE 2,036,453

SEAL FOR AXLE BEARINGS

Victor Alexander Bary, London, England

Application August 1, 1930, Serial No. 472,393
In Great Britain August 13, 1929

4 Claims. (Cl. 286—5)

In axle bearings, particularly for vehicles which run on rails, the size of the axle-box is definitely fixed by the sizes of a number of measurements. In the known constructions of axle boxes these measurements are determined in the first place by the circumstance that the surface of the oil supply, at the greatest inclination which it assumes under the influence of centrifugal force when travelling around curves and under the influence of any shocks to which it may be subjected, should lie below the dust pocket opening, the size of which is again determined by the size by the oil retaining ring arranged on the shoulder of the journal. The dust pocket opening must be greater than the greatest diameter of the said ring, in order that the axle box can be fitted over it on the journal. The diameter of the oil retaining ring itself is fixed by the necessity of exerting on the lubricant centrifugal forces of such power that it is thrown off with certainty at the ordinary speeds of the vehicle. Also, the surface of the lubricant supply determines the bottom of the lubricant supply container, because the lubricant transfer devices must dip into it to a certain depth in order to be able to transfer sufficient lubricant to the bush or axle-brass. The known constructions of axle boxes resulted therefore in a somewhat large axle box and a primary object of the present invention is to reduce the size of such axle box. The problem is solved, according to the invention, by arranging the dust pockets, which face the boss of the wheel, between the rear wall of the axle-box and a separate cap or cover. Removable dust guards in axle-bearings which are not provided with an oil retaining ring are known. With these arrangements however, the difficulties in the way of a reduction in the size of the axle-box with the arrangement of an oil retaining ring did not arise. In contradistinction thereto, the present invention presents many possibilities of reducing the size of the dust pocket opening and therefore of raising the inclined surface of the supply of lubricant, and further, of raising the container for the latter, whereby the desired reduction in the size of the axle box is brought about. If, for example, the cap, in accordance with the invention, is fitted on the shoulder of the axle journal before the oil retaining ring is fitted, it at once becomes possible to make the dust pocket opening in the cap smaller than the greatest diameter of the oil retaining ring arranged in the axle box. This was not possible in the arrangements heretofore known because the dust pocket chamber was formed by special walls of the axle box itself, so that the closure wall of the dust pocket could not be separated from the axle box. The opening of the dust pocket as regards its diameter, which determines the dimensions of the lubricant container of the axle box, can also be kept smaller than or equal to the diameter of the oil retaining ring arranged in the axle-box if the cap, in at least one other diameter, preferably in that at right angles to the said diameter which determines the axle-box dimensions, is larger than the diameter of the oil retaining ring. The introduction of the cap is then effected after the oil retaining ring has been fitted, by passing it over the oil retaining ring in a position in which it is inclined about the greatest diameter, then, after it has been raised or lowered, it is brought into an upright position and lastly transferred into its final position. In either way the result is obtained that the lower edge of the dust pocket opening in the cap, which determines the uppermost position of the inclined surface of the lubricant supply, lies above the lowest edge of the oil retaining ring, so that the axle box can be reduced in size by an amount which corresponds to this raising in the height of the lower edge of the dust pocket opening in the cap.

Figure 2:
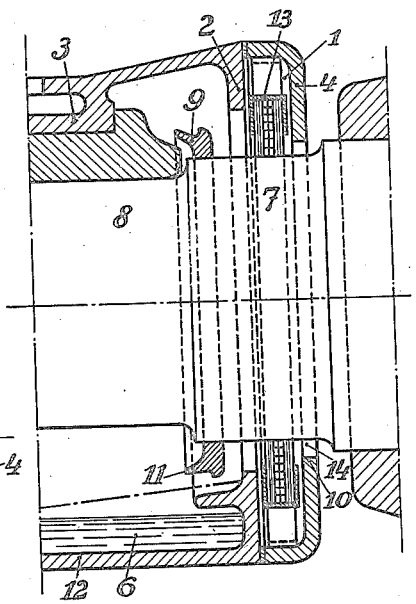
Figure 3:
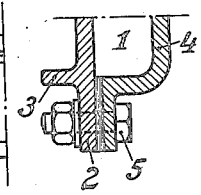
Figure 5:
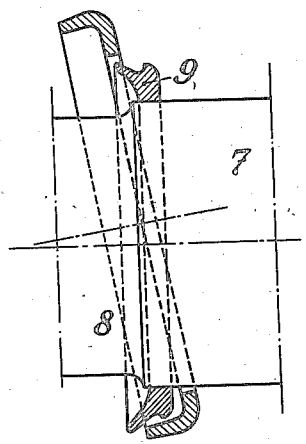
Figure 4:
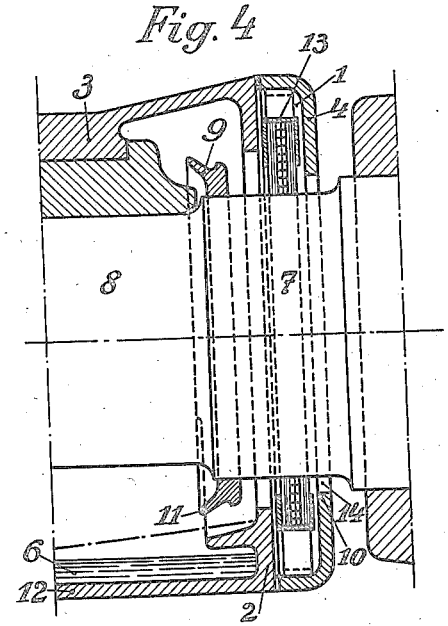

Various constructional embodiments of the subject matter of the invention are illustrated by way of example in the accompanying drawings, in which Fig. 1 is a view in end elevation of the dust pocket, Fig. 2 is a cross-section through the dust pocket in the direction of the axle journal, Fig. 3 is a section on the line III—III of Fig. 1, also in the direction of the journal, Fig. 4 is a section similar to that of Fig. 2, showing a modified form of construction, Fig. 5 represents one phase of the motion in the assembly of the arrangement illustrated in Fig. 4, Fig. 6 is a longitudinal section of the complete axle-bearing.

Referring to the drawings, in the constructional example illustrated in Fig. 2 as well as in that illustrated in Fig. 4, the dust pocket 1 is formed between the rear end wall 2 of the axle box 3 and a separate cap 4. The cap 4 is connected with the axle-box 3, or with its front wall 2, by means of bolts 5 arranged at the corners. According to the construction of Fig. 2, the dust pocket opening 14 of the cap 4, the size of which determines the position 14 of the cap 4, the size of which detemines the position as regards height of the inclined surface (which is illustrated by dotted line) of the lubricant supply 6, can be kept smaller than the diameter of the oil retaining ring 9 arranged on the shoulder 7 of the axle-journal 8 in the axle box 3, since the cap can be fitted on the shoulder 7 of the journal 8 before the ring 9 is fitted. Since in the known arrangements the lowest edge 10 of the dust pocket opening 14 must lie below the lowest edge 11 of the oil retaining ring 9, owing to the reduction in the diameter of the dust pocket opening to a size which is less than that of the oil retaining ring 9, an upward displacement of the edge 10 relatively to the axis is obtained. Owing to a corresponding upward displacement of the inclined surface of the lubricant supply the bottom 12 of the axle box 3 can be correspondingly raised while the depth to which the transfer device 16 (Fig. 6) dips into the lubricant remains the same and the size of the axle box is thereby considerably reduced. Lubricant retaining devices 13 are provided in the dust pocket 1 in a manner known per se.

Whereas in the embodiment according to Fig. 2 the dust pocket opening 14 is of circular shape and the diameter of the circular opening 14 is smaller than the greatest diameter of the oil retaining ring 9, in the form of construction illustrated in Fig. 4 there is provided in the separate cap 4 an opening 14 which is elliptical or oval and is such that one of its diameters is greater than the greatest diameter of the oil retaining ring while the diameter which determines the size of the axle box is again smaller than the diameter of the oil retaining ring. Accordingly, the diameter in the plane of the drawing which determines the size of the axle box is smaller than the diameter of the oil retaining ring, while the diameter at right angles to the plane of the drawing is greater than the greatest diameter of the oil retaining ring 9. By this means the fitting of the cap 4 or of the axle box 3 can be effected after the oil retaining ring has already been fastened to the shoulder 7 of the axle journal 8 by bringing the cap into a position which is inclined about the diameter which is greater than the greatest diameter of the oil retaining ring. In this position the cap is passed over the ring and then, according to its position of inclination, raised or lowered. Fig. 5, for example, shows a position of inclination in which the cap 4 must be raised after passing over the ring 9. In this condition the opening 14 is quite sufficient to permit the transfer of the cap 4 into its final position. Furthermore, in the construction illustrated in Fig. 4 the determinative lower edge 10 of the dust pocket opening is higher than the lowest edge 11 of the oil retaining ring 9, so that in that case also a corresponding reduction in the size of the axle box is obtained.

Fig. 6 is a general view in vertical section in which 8 represents the axle journal, carrying above the bush or axle brass 15 the axle box 3. Transfer device 16 revolves conjointly with axle journal 8 dipping into oil supply 6 and transferring oil into chamber 17. The oil collected in chamber 17 is fed over grooves 18 to axle brass 15 for distribution in a suitable manner to produce a film of lubricant between axle journal and axle brass. The surplus oil flows back into oil supply 6 for renewed circulation. Oil retaining ring 9 prevents any surplus oil from entering dust pocket 1, said oil retaining ring being fitted a short distance away from the dust pocket on the shoulder of axle journal 8.

I claim:

1. In an axle bearing including an axle box having a rear end wall, a shouldered axle journal, an axle brass, means mounted on the journal for lifting lubricating oil from the bottom of the box onto the axle brass, and an oil retaining ring rigidly and non-removably mounted on said axle journal, said end wall having an opening of larger dimensions than those of said ring, a dust-proof packing comprising a cap completely separate from the housing and open towards the rear end wall of the axle box to provide a dust pocket and having an aperture of elliptical shape adapted to receive said axle journal, the large diameter of said elliptically shaped aperture being larger than the outside diameter of said oil retaining ring, and the small diameter of said aperture being smaller than the outside diameter of said oil retaining ring, said cap aperture being adapted to permit of said cap being passed over the oil retaining ring, already fixed to the shoulder of said axle journal, in a position inclined to the largest diameter of the aperture, and, after raising or lowering of said cap to permit of the same being brought into its final position.

2. In an axle bearing including an axle box having a rear end wall, an axle journal, an axle brass resting on said journal, means mounted on the journal for lifting lubricating oil from the bottom of the box onto the axle brass, and an oil retaining ring rigidly and nonremovably mounted on said journal, said end wall having an opening of larger dimensions than those of said ring, a dust-proof packing comprising a cap completely separate from the housing and open towards the rear end wall of the axle box and provided with an aperture to permit said axle journal to pass therethrough, the diameter of said aperture being smaller than that of the ring at least in one direction, so that said cap cannot be made to pass over said ring while they are positioned in parallel planes, dust-proof packing means between the said end wall of the axle box and said cap and constructed to be removable from the journal while the oil retaining ring and cap are positioned on the latter, at least a portion of the periphery of the aperture in said cap being nearer to the journal than the outer periphery of the ring, whereby at said portion said cap provides a backing of greater radial extent for said packing means, and detachable means for fixing said cap to the axle box.

3. In an axle bearing including an axle box having a rear end wall integral therewith, an axle journal, a lubricant transfer device revolving conjointly with said axle journal, an axle brass resting on said journal, means for feeding lubricant lifted by said transfer device to said axle brass, and an oil retaining ring rigidly and nonremovably mounted on said journal, said end wall having an opening of larger dimensions than those of said ring, a dust-proof packing comprising a cap completely separated from the housing and open towards the rear end wall of the axle box and provided with a central aperture to permit the axle journal to pass therethrough, the diameter of said aperture being smaller than that of the ring at least in one direction, so that said cap cannot be made to pass over said ring while they are positioned in parallel planes, dust-proof packing means between the said end wall of the axle box and said cap and constructed to be removable from the journal while the retaining ring and cap are positioned on the latter, at least a portion of the periphery of the aperture in said cap being nearer to the journal than the outer periphery of the ring, whereby at said portion said cap provides a backing of greater radial extent for said packing means, and detachable means for fixing said cap to said end wall.

4. An axle axle bearing as set forth in claim 2, wherein the axle journal is shouldered and the oil-retaining ring is shrunk on the axle, and wherein the aperture in the cap is of circular form and of smaller diameter than the outside diameter of the oil-retaining ring, whereby the periphery of such aperture is nearer to the journal than the outer periphery of the ring and the cap thus provides a backing of greater radial extent for the packing means, the packing being made of a plurality of parts and being mounted on the journal shoulder.

VICTOR ALEXANDER BARY.